United States Patent [19]

Abe et al.

[11] 4,396,654

[45] Aug. 2, 1983

[54] IMPACT RESISTANT RESIN COMPOSITION

[75] Inventors: Mitsuo Abe; Yozo Kitagawa, both of Yokkaichi; Tadahiko Tsutsumi, Suzuka; Tadashi Kato; Seiichi Atomori, both of Yokkaichi, all of Japan

[73] Assignee: Japan Synthetic Rubber Co., Ltd., Tokyo, Japan

[21] Appl. No.: 276,875

[22] Filed: Jun. 24, 1981

[30] Foreign Application Priority Data

Jun. 27, 1980 [JP] Japan ................................. 55-86651

[51] Int. Cl.³ ........................................... C08F 279/04
[52] U.S. Cl. .................................... 428/35; 428/314.4; 428/319.3; 428/319.7; 428/424.7; 428/86
[58] Field of Search ............................. 525/76, 77, 86; 260/29.1 SB, 23.7 N; 428/314.4, 319.3, 319.7, 424.7, 35

[56] References Cited

U.S. PATENT DOCUMENTS

| | | | |
|---|---|---|---|
| 3,010,936 | 11/1961 | Irvin | 525/77 |
| 3,624,183 | 11/1971 | Leach | 525/86 |
| 3,703,491 | 11/1972 | Takayama | 260/23.7 N |
| 3,928,494 | 12/1975 | Aliberti | 525/76 |
| 4,048,274 | 9/1977 | Hoge | 428/319.7 |
| 4,104,328 | 8/1978 | Swoboda | 525/86 |
| 4,107,234 | 8/1978 | Cornell | 525/86 |
| 4,202,948 | 5/1980 | Peascoe | 525/77 |
| 4,228,051 | 10/1980 | Sakano | 260/23.7 R |
| 4,264,747 | 4/1981 | Paddock | 525/76 |

FOREIGN PATENT DOCUMENTS 54-101882 9/1979 Japan .

*Primary Examiner*—Paul R. Michl
*Attorney, Agent, or Firm*—Oblon, Fisher, Spivak, McClelland & Maier

[57] ABSTRACT

When the impact resistant resin composition comprising a graft polymer in which an aromatic alkenyl compound and an alkenyl cyanide compound are grafted on a rubbery polymer, and a matrix consisting essentially of an aromatic alkenyl compound-alkenyl cyanide compound copolymer satisfies the following conditions, the composition has an improved vacuum formability and the molded articles obtained by vacuum-forming the same have smaller variations in thickness at any given area and there is a smaller reduction of strength due to contact with foamed polyurethane:

(1) the proportion of the rubbery polymer in said impact resistant resin composition is 10–30% by weight,
(2) the graft polymer has a degree of grafting of 70–120% by weight,
(3) the matrix has an intrinsic viscosity of 0.55–0.80 dl/g as measured at 30° C. in methyl ethyl ketone, and
(4) the weight ratio of the aromatic alkenyl compound to the alkenyl cyanide compound in the impact resistant resin composition is in the range of 2.0–2.8. When said resin composition contains further 0.01–2.0% by weight of a diorganopolysiloxane having a viscosity of 5–100,000 centistokes at 25° C. and/or 0.1–3% by weight of a metal salt of a fatty acid, its ability to maintain the strength upon contact with foamed polyurethane is enhanced.

9 Claims, No Drawings

IMPACT RESISTANT RESIN COMPOSITION

This invention relates to an impact-resistant, rubber-reinforced resin composition, and particularly to an impact resistant resin composition suitable for the production of a box body of refrigerator.

When molded articles having a complicated shape and a great unfolded area, such as the inner box of a refrigerator made of a synthetic resin, are produced by vacuum forming, the variations in thickness at any given area cannot be eliminated even by a high level of forming technique, and therefore, heavy-gauge plates of synthetic resin have been used for said forming. On the other hand, it is the general tendency in the current molding and processing industries to use a synthetic resin plate having a thickness as small as possible in the step of vacuum-forming for the purpose of economizing resources and reducing cost. When a light-gauge molded article is used as above, it is greatly desired to develop a resin giving smaller variations in thickness at any given area in molded articles.

The box body of refrigerator has such a structure that the inner box and the outer box are separated by a heat-insulation material, and in most cases it is produced by foam-molding polyurethane, utilizing the superiority of foamed polyurethane as a heat insulation material. This process has the merit that the process enables the simplification of steps as well as the merit that the heat conductivity of foamed polyurethane is lower than that of glass fiber or foamed polystyrene so that the heat insulation material layer can be thinned, which enables, to that extent, an increase of the effective inner volume of refrigerator and the saving of cooling energy. However, by this process, the inner box made of a synthetic resin comes in contact with the isocyanate compound and polyol compound used as the starting components for the foamed polyurethane and with the Freon gas used as a foaming agent, and as a result, the inner box made of a synthetic resin is chemically corroded by these starting components and its strength is markedly decreased.

Further, by this working method, the inner box made of a synthetic resin and the foamed polyurethane are bonded to each other, and, at the same time, a layer of hard polyurethane which has scarcely been foamed is formed at their interface. Since this hard polyurethane layer is weak, cracks are easily caused thereon owing to temperature difference or slight shock, and act upon the inner box made of synthetic resin as a notch effect to decrease the strength of the inner box to a marked extent.

In order to prevent the strength of the inner box made of synthetic resin in contact with the foamed polyurethane from being decreased, there have been proposed various processes such as a process which comprises coating an aqueous rubber latex to form a film on the side of synthetic resin inner box to be contacted with foamed polyurethane, and then injecting and foaming polyurethane (Japanese Patent Publication No. 13,547/71), a process which comprises vacuum-forming a plastic composite material which has a fluorinated hydrocarbon-resistant film into an inner box instead of the application of the aqueous rubber latex (Japanese Patent Publication No. 13,550/71), a process in which a three-layer ABS sheet comprising a middle layer of an acrylonitrile-rich ABS resin held between two outer layers of butadiene-rich ABS resin is used (Japanese Patent Application Kokai (Laid-Open) No. 101,882/79), etc. However, all these processes are disadvantageous in that the process of the production of a box body of refrigerator becomes complicated and the cost becomes high.

The object of this invention is to provide an impact resistant resin composition which has an improved vacuum-formability and can provide a molded article which has smaller variations in thickness at any given area and which has a smaller reduction of strength due to contact with foamed polyurethane.

According to this invention, there is provided an impact resistant resin composition comprising a graft polymer in which an aromatic alkenyl compound and an alkenyl cyanide compound are grafted on a rubbery polymer, and a matrix consisting essentially of an aromatic alkenyl compound-alkenyl cyanide compound copolymer, characterized in that:

(1) the proportion of the rubbery polymer in said impact resistant resin composition is 10–30% by weight,
(2) the graft polymer has a degree of grafting of 70–120% by weight,
(3) the matrix has an intrinsic viscosity of 0.55–0.80 dl/g as measured at 30° C. in methyl ethyl ketone, and
(4) the weight ratio of the aromatic alkenyl compound to the alkenyl cyanide compound in the impact resistant resin composition is in the range of 2.0–2.8.

The rubbery polymer usable in this invention includes polybutadiene, acrylonitrile-butadiene copolymer, butadiene-styrene copolymer, polyisoprene, polychloroprene, ethylene-propylene-diene type rubber, and the like. They may be used either alone or in combination of two or more. The content of said rubber in the impact resistant resin composition is 10% by weight or more, preferably 12% by weight or more, from the viewpoint of impact resistance. In order to retain a satisfactory heat distortion temperature and stiffness, said content should be 30% by weight or less, preferably 25% by weight or less.

The aromatic alkenyl compound used in the graft polymer and the matrix in this invention includes styrene, α-methylstyrene, dimethylstyrene, vinyltoluene, alkoxystyrene and the like. The alkenyl cyanide compound used in the graft polymer and the matrix in this invention include acrylonitrile, methacrylonitrile and the like. Said monomers may be used either alone or in combination of two or more.

In the impact resistant resin composition of this invention, it is necessary that the graft polymer has a degree of grafting of 70–120% by weight. Preferably, the degree of grafting is 90–110% by weight. It is also necessary that the matrix consisting essentially of an aromatic alkenyl compound-alkenyl cyanide compound copolymer have an intrinsic viscosity of 0.55–0.80 dl/g, preferably 0.60–0.75, as measured at 30° C. in methyl ethyl ketone. When the degree of grafting of the graft polymer is less than 70% by weight or when the intrinsic viscosity of the matrix is less than 0.55, it is impossible to retain the good vacuum-formability and the good strength at the time of contact with foamed polyurethane aimed at in this invention. On the other hand, if the degree of grafting exceeds 120% by weight, the rubbery polymer losses the rubbery character, so that the development of the intended strength cannot be expected. If the intrinsic viscosity exceeds 0.80 dl/g, the flow property of the resin composition at the time of processing is greatly deteriorated, which is undesirable.

Further, in the impact resistant resin composition of this invention, it is necessary that the weight ratio of the aromatic alkenyl compound to the alkenyl cyanide compound be in the range of 2.0–2.8. The weight ratio is preferably 2.1–2.6. If this weight ratio exceeds 2.8, the maintenance of the good strength at the time of contact with foamed polyurethane, which is an object of this invention, cannot be achieved. If it is less than 2.0, the heat stability at the time of molding and processing is decreased, and hence, this is undesirable.

The graft impact resistant resin composition of this invention can be prepared by a method which comprises adding a monomer mixture of an aromatic alkenyl compound and an alkenyl cyanide compound to a rubbery polymer in the form of a latex and subjecting the resulting mixture to an emulsion polymerization, as well as by conventional graft polymerization methods, such as bulk-suspension polymerization method, solution polymerization method, emulsion-bulk polymerization method and the like. For example, in the case of emulsion graft polymerization, a redox system comprising an organic peroxide and an iron salt is used as an initiator. As said organic peroxide, cumene hydroperoxide, diisopropylbenzene hydroperoxide, p-menthane hydroperoxide and the like may be used. As said iron salt, either of ferrous salts or ferric salts may be used. Usually, sulfates and hydrochlorides are used.

Said organic peroxide is preferably used in an amount of 0.1–1.0 part by weight per 100 parts by weight of the polymerizable monomers, and said iron salt is preferably used in an amount of 0.001–0.1 part by weight based on the same.

As the emulsifier, any of those employed in the usual emulsion polymerization may be used. Generally, however, sodium salts or potassium salts of disproportionated rosin acid, hydrogenated rosin acid and the like are used. Salts of fatty acids having 8–18 carbon atoms may also be used.

Further, a polymerization regulator may be used if necessary. For example, a long chain mercaptan such as normal or tertiary dodecylmercaptan or a terpene mixture consisting of dipentene, terpinolene, α-terpinene and a small amount of other cyclic terpenes is usually employed in an amount of about 0–1.0 part by weight.

The polymerization temperature is preferably in the range of 40° to 95° C. If it is lower than 40° C., the progress of reaction is difficult. If it exceeds 95° C., the polymerization system becomes instable and coagulum tends to be formed.

Apart from the above-mentioned production under appropriate polymerization conditions, it is also allowable to employ the process often carried out in this field which comprises previously producing a high rubbery resin composition which contains a graft polymer having a degree of grafting within the specified range and then blending it with a copolymer of an aromatic alkenyl compound and an alkenyl cyanide compound to regulate the rubbery polymer content.

In this invention, if necessary, a diorganopolysiloxane having a specific viscosity and/or a metal salt of a fatty acid may be added to said resin composition, whereby the excellent ability to retain the strength at the time of contact with foamed polyurethane can be exhibited to the highest extent.

As said diorganopolysiloxane used in this invention, those having a viscosity falling in the range of 5–100,000 centistokes, particularly 5,000–50,000 centistokes, at 25° C. are preferred. The diorganopolysiloxane may have at least one substituent selected from the group consisting of alkyl, aryl and vinyl. Said diorganopolysiloxane may be used either alone or in combination of two or more. The amount thereof is preferably about 0.01–2.0% by weight, more preferably about 0.05–1.0% by weight, based on the weight of the impact resistant resin composition.

Said metal salt of fatty acid is a metal salt of a straight chain saturated fatty acid having 12 or more carbon atoms, such as lauric acid, palmitic acid, stearic acid or the like. Said metal is selected from the group consisting of magnesium, calcium, strontium, barium, zinc, cadmium, aluminum, tin, lead and the like. The metal salt of fatty acid may be used either alone or in combination of two or more. The amount thereof is preferably 0.1–3% by weight based on the weight of the impact resistant resin composition. When the amount is 0.5–1.5% by weight, the object of this invention can be achieved best.

The method of blending the resin composition of this invention with the above-mentioned additives is not critical, but a usual method of blending is employed. For example, predetermined quantities of both the materials may be weighed out and then blended together by means of a Henschel mixer, a tumbler or the like or melt-blended by means of a hot roll, a Banbury mixer or the like. It is needless to say that a stabilizer, a colorant and other additives may be added, if necessary, during the above-mentioned blending.

This invention will be explained below in detail referring to Examples. In the Examples, the performances obtained when an acrylonitrile-butadiene-styrene resin (hereinafter, referred to as "ABS resin") was used as the impact resistant resin composition comprising a rubbery polymer, an aromatic alkenyl compound and an alkenyl cyanide compound were evaluated.

The powdery ABS resins of Sample Nos. 1–7 shown in Table 1 were prepared by an emulsion polymerization method in a 10-liter glass reaction vessel.

The degree of grafting shown in Table 1 was measured by the following method: A predetermined amount (A) of powdery ABS resin was added to acetone, and the free acrylonitrile-styrene copolymer was completely dissolved. From the solution, the insoluble fraction having a weight (B) was separated by means of a centrifugal machine. The degree of grafting was calculated according to the following equation:

$$\text{Degree of grafting} = \frac{B - A \times \left(\begin{array}{c}\text{Fraction of rubber} \\ \text{in } ABS \text{ resin}\end{array}\right)}{A \times \left(\begin{array}{c}\text{Fraction of rubber} \\ \text{in } ABS \text{ resin}\end{array}\right)} \times 100$$

EXAMPLES 1–4

Each of the powdery ABS resins of Sample Nos. 1, 2, 3 and 4 was melt-blended and pelletized by means of a 50 mm φ extruder. The pellets thus obtained were formed into a sheet having a thickness of 1.5 mm and a width of 400 mm by means of a 40 mm φ extruder equipped with a T-die. From the sheet were cut out strip-formed flat plates having a width of 5 mm and a length of 110 mm, which were used as test pieces for evaluating the vacuum-formability.

The test piece was placed in a thermostatic chamber having a double front glass system through which the inside could be observed, the inside temperature of the chamber having been controlled to 180° C. After fixing only the upper end of the test piece with a clamp, it was hung down vertically. After five minutes, the position of the lower end of the test piece was measured. By this, the sag of test piece due to its own weight was determined, and employed as a yardstick for vacuum-formability.

A greater value of this sag means that the sag of resin sheet will be greater at the stage of heating the sheet in the vacuum-forming process. When the distance from the heater to the resin sheet surface varies greatly with position, an uneven heating occurs to a marked extent. If vacuum-forming is carried out in such a state, the variations in thickness at any given area become great. That is, a greater value of the above-mentioned sag of resin sheet means that the variations in thickness at any given area of a molded article become greater, and this is undesirable.

Further, with the aim of measuring the strength in the state of being contacted with foamed polyurethane, square-formed flat plates having a side length of 150 mm were prepared from the above-mentioned extruded sheet. This flat plate was placed on the open end of a hollow, bottomed, rectangular-box having a side length of 150 mm and a depth of 30 mm, and a starting material for foamed polyurethane (comprising as main components modified tolylene diisocyanate and polyether having hydroxy value of 400 and molecular weight of 3300) was poured into the cavity of the box and allowed to foam. Thus, a flat plate having foamed polyurethane bonded to one of its surfaces was obtained. After conditioning the plate in a low temperature chamber kept at −30° C., the drop weight impact strength at this temperature was measured by the use of Du Pont drop-weight tester. In this measurement, the plate was fixed so that the ABS resin sheet was upward, and the striking member used had a tip radius of ¼ inch.

EXAMPLE 5

1.0 PHR of magnesium stearate was added to the powdery ABS resin of Sample No. 3, and stirred and mixed by means of a Henschel mixer. Thereafter, the procedure of Examples 1-4 was repeated.

EXAMPLE 6

The procedure of Example 5 was repeated, except that the magnesium stearate was replaced with aluminum stearate, and thereafter the performances were evaluated.

EXAMPLE 7

The procedure of Example 5 was repeated, except that the magnesium stearate was replaced with 0.2 PHR of polydimethylsiloxane having a viscosity of 10,000 centistokes.

EXAMPLE 8

The procedure of Example 5 was repeated, except that an additional 0.2 PHR of polydimethylsiloxane having a viscosity of 10,000 centistokes was added.

COMPARATIVE EXAMPLES 1-3

Each of the powdery ABS resins of Sample Nos. 5, 6 and 7 was melt-blended and pelletized by means of a 50 mm φ extruder. Thereafter, the procedure of Examples 1-4 was repeated.

COMPARATIVE EXAMPLE 4

To the powdery ABS resin of Sample No. 6 was added 1.0 PHR of magnesium stearate, and the resulting mixture was stirred by means of a Henschel mixer. Thereafter, the procedure of Examples 1-4 was repeated.

COMPARATIVE EXAMPLE 5

The procedure of Comparative Example 4 was repeated, except that the magnesium stearate was replaced with aluminum stearate, and thereafter the performances were evaluated.

COMPARATIVE EXAMPLE 6

The procedure of Comparative Example 4 was repeated, except that the magnesium stearate was replaced with 0.2 PHR of polydimethylsiloxane having a viscosity of 10,000 centistokes.

COMPARATIVE EXAMPLE 7

The procedure of Comparative Example 4 was repeated, except that an additional 0.2 PHR of polydimethylsiloxane having a viscosity of 10,000 centistokes was added.

The results of evaluation of drop weight impact strength in Examples 1-8 and Comparative Examples 1-7 are shown in Table 2.

It is apparent from the results of evaluation shown in Table 2 that the resin composition according to this invention has a good vacuum-formability and shows a good maintenance of strength in contact with foamed polyurethane.

TABLE 1

| | Sample No. | | | | | | |
|---|---|---|---|---|---|---|---|
| | 1 | 2 | 3 | 4 | 5 | 6 | 7 |
| Rubber content in ABS resin (% by weight) | 13 | 15 | 18 | 21 | 15 | 18 | 21 |
| Styrene/ acrylonitrile weight ratio | 2.2 | 2.45 | 2.67 | 2.8 | 3.2 | 2.8 | 2.8 |
| Intrinsic viscosity [η] of matrix component as measured at 30° C. in methyl ethyl ketone (dl/g) | 0.61 | 0.77 | 0.70 | 0.68 | 0.70 | 0.68 | 0.46 |
| Degree of grafting (%) | 103 | 105 | 99 | 94 | 96 | 53 | 95 |

TABLE 2

| Example No. | 1 | 2 | 3 | 4 | 5 | 6 | 7 | 8 |
|---|---|---|---|---|---|---|---|---|
| Sample No. of ABS resin | 1 | 2 | 3 | 4 | 3 | 3 | 3 | 3 |
| Sag at 180° C. after 5 min. (mm) | 11 | 12 | 10 | 7 | 10 | 9 | 9 | 8 |
| Du Pont drop-weight impact strength (kg-cm) | 12 | 9 | 13 | 14 | 17 | 16 | 18 | 21 |

| Comparative Example No. | 1 | 2 | 3 | 4 | 5 | 6 | 7 |
|---|---|---|---|---|---|---|---|
| Sample No. of ABS resin | 5 | 6 | 7 | 6 | 6 | 6 | 6 |
| Sag at 180° C. after 5 min. (mm) | 17 | 18 | 21 | 17 | 18 | 17 | 16 |
| Du Pont drop-weight impact strength (kg-cm) | 2 or less | 2 or less | 2 or less | 3 | 3 | 4 | 5 |

What is claimed is:

1. A refrigerator box body comprising an inner box made from an impact resistant resin composition comprising a graft polymer in which styrene and acrylonitrile are grafted on a rubbery polymer, and a matrix consisting essentially of a styrene-acrylonitrile copolymer, characterized in that:

(1) the proportion of the rubbery polymer in said impact resistant resin composition is 10-30% by weight, (2) the graft polymer has a degree of grafting of 70-120% by weight, (3) the matrix has an intrinsic viscosity of 0.55-0.80 dl/g as measured at 30° C. in methyl ethyl ketone, and (4) the weight ratio of the styrene to the acrylonitrile in the impact resistant resin composition is in the range of 2.0-2.8, and an insulating layer of foamed polyurethane surrounding the outside of said inner box and in contact therewith.

2. A refrigerator box body according to claim 1, wherein said rubbery polymer is at least one member selected from the group consisting of polybutadiene, acrylonitrile-butadiene copolymer, butadiene-styrene copolymer, polyisoprene, polychloroprene and ethylene-propylene-diene type rubbers.

3. A refrigerator box body according to claim 1, wherein the proportion of the rubbery polymr in the impact resistant resin composition is 12-25% by weight.

4. A refrigerator box body according to claim 1, wherein the degree of grafting is 90-110% by weight.

5. A refrigerator box body according to claim 1, wherein the matrix has an intrinsic viscosity of 0.60-0.75 dl/g as measured at 30° C. in methyl ethyl ketone.

6. A refrigerator box body according to claim 1, wherein the weight ratio of the styrene to the acrylonitrile in the resin composition is in the range of 2.1-2.6.

7. A refrigerator box body according to claim 1, which additionally contains a diorganopolysiloxane having a viscosity of 5-100,000 centistokes at 25° C. in a proportion of 0.01-2.0% by weight based on the weight of the impact resistant resin composition.

8. A refrigerator box body according to claim 7, wherein the organic substituent of said diorganopolysiloxane is at least one member selected from the group consisting of alkyl, aryl and vinyl.

9. A refrigerator box body according to claim 1, which additionally contains a metal salt of a fatty acid having 12 or more carbon atoms in a proportion of 0.1-3% by weight based on the weight of the impact resistant resin composition.

* * * * *